April 29, 1947.  E. L. FOY  2,419,636
APPARATUS FOR AUTOMATICALLY OPERATING DUMP TRUCK TAIL GATES
Filed Aug. 16, 1944  2 Sheets-Sheet 1
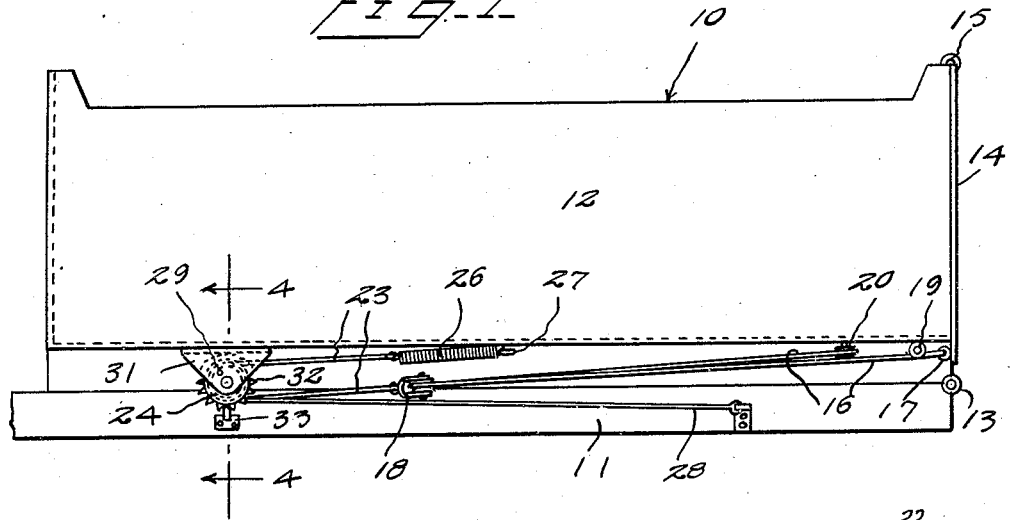
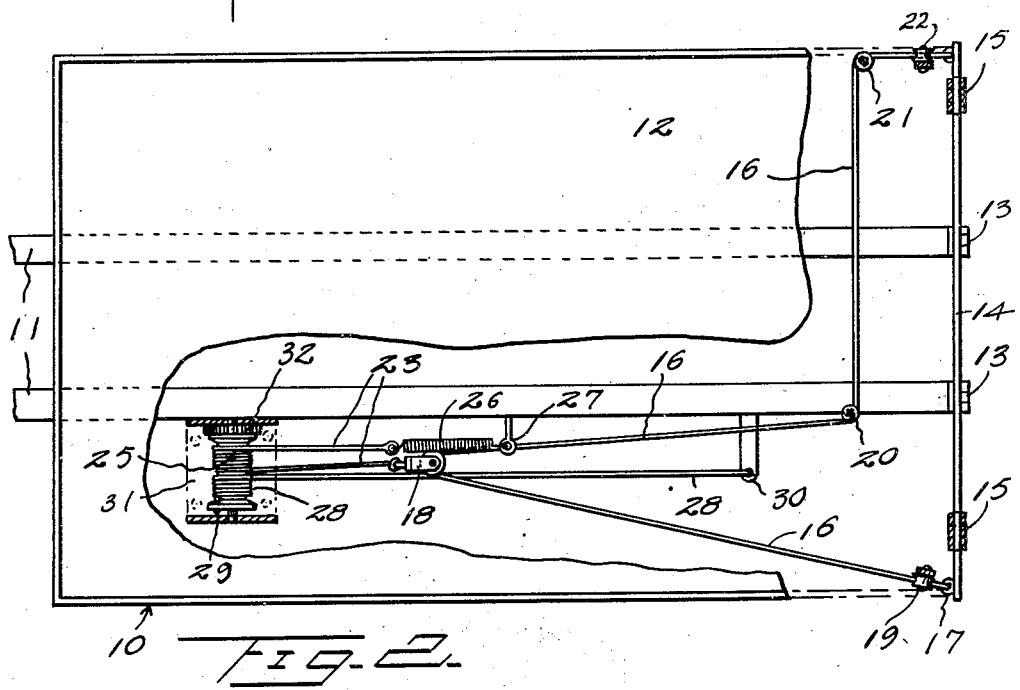
Inventor
E. L. Foy
By L. F. Randolph
Attorney

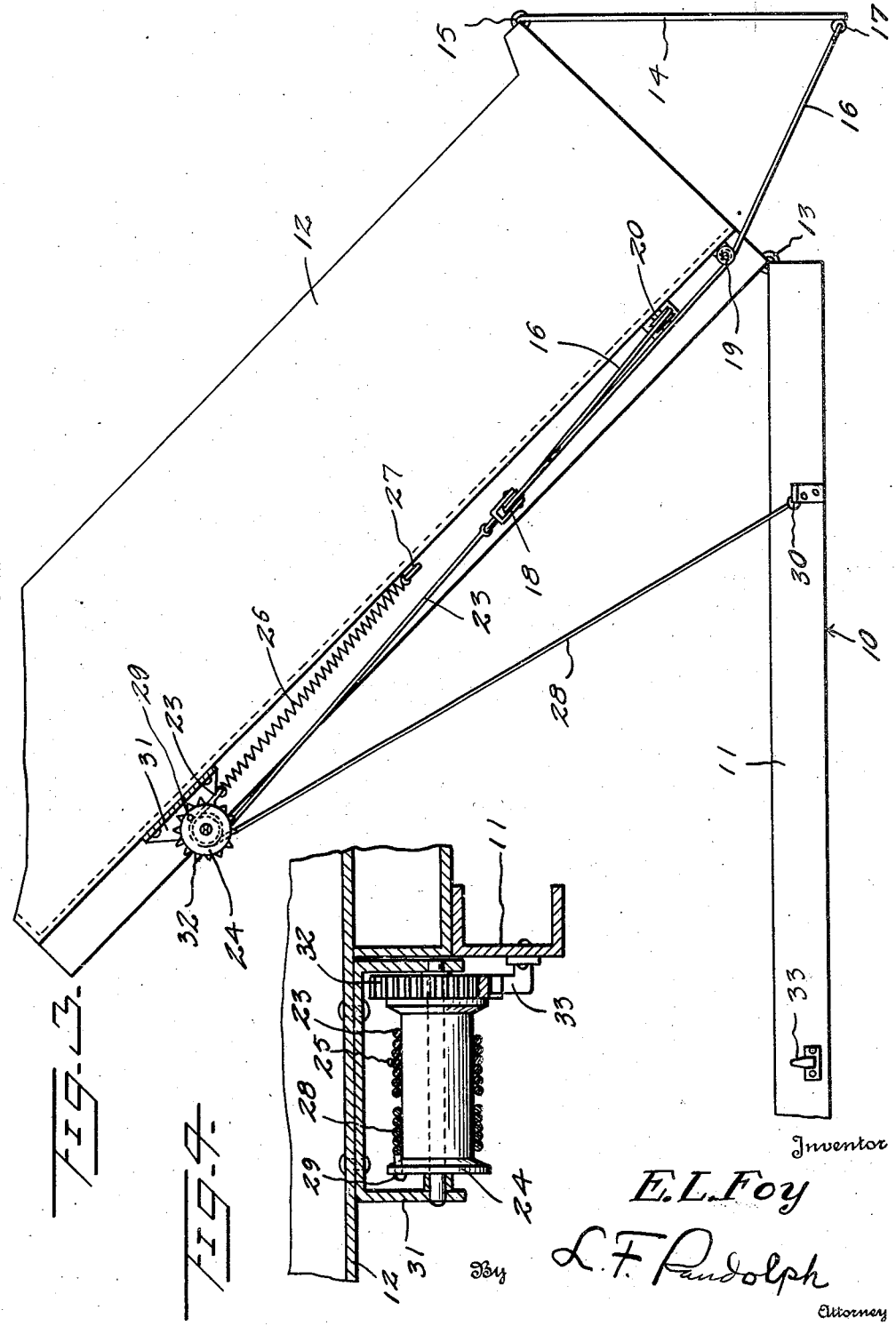

Patented Apr. 29, 1947

2,419,636

UNITED STATES PATENT OFFICE 2,419,636

APPARATUS FOR AUTOMATICALLY OPERATING DUMP TRUCK TAIL GATES

Everett L. Foy, East Rainelle, W. Va.

Application August 16, 1944, Serial No. 549,711

7 Claims. (Cl. 298—23)

This invention relates generally to dump trucks and more particularly to apparatus for automatically controlling the opening, closing, and locking operations of tail gates for dump truck bodies. More specifically, the present invention contemplates automatic apparatus of the aforedescribed type for tail gates of the type adapted to be opened under pressure of the discharging load and/or under the force of gravity acting thereon as the truck body is tilted to a load-discharging position.

According to the arrangement of the present invention, coacting and interconnecting means are provided between the tail gate, dump body, and truck chassis whereby the tail gate is locked positively to the dump body when the dump body rests on the chassis in a load-carrying position thereon; the positive lock is released when the dump body is tilted to a predetermined position; and the extent to which the tail gate thereafter may be opened is controlled yieldably in accordance with the degree of tilt of the dump body beyond said predetermined position.

An object of the invention is to provide apparatus which is capable of the foregoing functions and which possesses all of the desired qualities of ruggedness and simplicity of construction, economy of manufacture, adaptability to dump trucks of different designs, and reliability in operation.

The foregoing and other objects and advantages of the invention are implied from or inherent in the novel combination, construction, and arrangement of parts hereinafter to be described in detail with reference to the accompanying drawings and thereafter claimed, having the above stated objects in view.

In the accompanying drawings, a preferred embodiment of the invention constructed in accordance with the best mode thus far devised as a practical application of the principles thereof is disclosed, wherein:

Figure 1 is a view in elevation of a portion of a dump truck employing the automatic tail gate apparatus of the present invention, Figure 2 is a plan view of the truck portion shown in Figure 1, Figure 3 is a view in elevation of the truck portion shown in Figure 1 and illustrating the dump body and tail gate in their respective load-discharging positions, and Figure 4 is an enlarged sectional view of the drum and associated parts as viewed along the line 4—4 of Figure 1.

Referring now to the drawings for a detailed description of the invention, the numeral 10 generally designates a dump truck having a chassis 11 upon which a dump body 12 is tiltably supported as at 13.

The dump body is provided with a tail gate 14 which is supported for swinging movement on the dump body, being hinged thereto at the top of the tail gate as at 15. By reason of this mounting of the tail gate, the tail gate swings open under the force of gravity acting thereon and under pressure of the discharging load as the dump body is tilted into load discharging positions thereof.

A cable 16 or any suitable flexible rope, chain, or the like is secured at the ends thereof to the lower ends of the tail gate respectively, as indicated at 17, and the cable is provided with sufficient slack whereby the cable may be reeved or trained over the pulley of a movable block or sheave 18 and over the fixed pulleys 19 through 22 rotatively supported on the dump body. Pulleys 19 and 22 serve to accommodate cable 16 to the different positions of the tail gate as the same swings open, and pulleys 20 and 21 serve to equalize the tension applied to the ends of the tail gate when tension is applied to sheave 18 by way of a cable 23 connected thereto.

Cable 23, which may be any suitable flexible rope, chain, or the like, preferably is wound seven times about a drum 24 in a clockwise direction thereof as viewed in Figure 1 or Figure 3 and the fourth turn preferably is secured to the drum by any suitable means such, for example, as a bolt, screw, or the like indicated at 25. The end of cable 23 extending beyond the turns is secured to a coil spring 26 which is secured at the other end thereof to the dump body as at 27. It will be obvious that, if desired, two cables may be used in place of the single cable 23 in which case each of the two cables is secured at one end thereof to the drum after first being wound thereon preferably four times.

A second cable 28, which also may be any suitable flexible rope, chain, or the like, is secured to the drum as at 29 and thereafter is wound preferably five times thereabout in a counterclockwise direction as viewed in Figure 1 or Figure 3, and then secured to the truck chassis as at 30.

The drum 24 is rotatively supported on a bracket 31 which is mounted on the dump body in such a position that a gear 32 fixed to or formed integrally with the drum, is caused to be engaged between a pair of adjacent teeth thereof by a sharp upstanding member or lug 33 secured to the truck chassis when the dump body rests in a load-carrying position on the chassis, thereby to lock the drum against rotation until the dump body is tilted sufficiently to disengage the gear from lug 33.

In operation, when the drum is free to rotate, initial tension in coil spring 26 causes the drum to be rotated in a clockwise direction as viewed in Figure 1 or Figure 3, thereby to take up any slack in cables 16 and 23 and 28. Accordingly, when the drum becomes locked against rotation as the dump body comes to rest on the chassis and the tail gate closes, cables 16 and 23 provide a non-yieldable connection between the dump body and tail gate, thereby to provide a positive lock therebetween.

As the dump body moves toward the fully tilted position thereof after first moving sufficiently to release the drum for rotation, cable 28 causes the drum to be rotated in a counterclockwise direction for the reason that the distance between the drum and point 30 on the chassis increases as the dump body moves toward its fully tilted position whereby the length of cable 28 between the drum and chassis is caused to increase accordingly as the degree of tilting movement of the dump body increases.

As the drum rotates counterclockwise, one end of cable 23 additionally winds thereon to increase the tension in coil spring 26 and the other end is payed out from the drum thereby to permit the tail gate to swing open progressively in accordance with the continued movement of the dump body toward its fully tilted position. In the event that pressure on the tail gate, produced by shock as the load suddenly is discharged, for example, exceeds the tension in the spring, the resulting greater tension in cables 16 and 23 also causes the drum to rotate counterclockwise, thereby to increase the tension in the spring and further to pay out cable 23 whereby the tail gate is caused additionally and yieldably to open in response to the shock thereon and thereby prevent damage which otherwise might be caused thereto.

As the dump body moves down from its fully tilted position, the drum is moved clockwise under power of the spring to take up the slack in cables 16, 23, and 28, which slack develops progressively as the length of cable 28 between the drum and chassis shortens in accordance with the degree of downward movement of the dump body, thereby to close the tail gate as the dump body comes to rest on the chassis.

While the invention has been described in particularity with respect to an embodiment thereof which gives satisfactory results, it will be apparent to those skilled in the art to which the invention appertains that the same is susceptible of additional embodiments and variations thereof without departing from the spirit and scope of the appended claims.

I claim as my invention:

1. In a dump truck of the character disclosed, the combination of a truck chassis, a tiltable dump body supported on said chassis, a swinging tail gate on the dump body adapted to be opened under pressure of the discharged load as the dump body is tilted into a load-discharging position, a drum rotatively supported on the dump body, and means including a plurality of cables for interconnecting said drum with the chassis and tail gate in such a manner as to control the opening movement of the tail gate in accordance with the degree of tilting movement of the dump body and a spring acting against the cables for constantly urging the tail gate toward a closed position.

2. In a dump truck of the character disclosed, the combination of a truck chassis, a tiltable dump body supported on said chassis, a swinging tail gate on the dump body adapted to be opened under pressure of the discharged load as the dump body is tilted into a load-discharging position, means including coacting means on the chassis and dump body respectively for positively locking the tail gate to the dump body when the dump body rests in a load-carrying position on the chassis and adapted to be released when the dump body is tilted to a predetermined position, and means including a plurality of cables interconnecting said chassis, dump body, and tail gate for controlling the extent to which the tail gate may be opened in accordance with the degree of tilt of the dump body beyond said predetermined position and a spring acting against the cables for constantly urging the tail gate toward a closed position.

3. In a dump truck of the character disclosed, the combination of a truck chassis, a dump body supported for tilting movement thereon, a swinging tail gate on the dump body adapted to swing open as the dump body is tilted into a load-discharging position, connecting means including a plurality of cables for interconnecting the tail gate and chassis, locking means connected to certain of the cables to lock the tail gate to the dump body until the dump body is tilted beyond a predetermined position thereof, said locking means including a drum on which certain of the cables are wound, and resilient connecting means including said first named connecting means for interconnecting the dump body with the chassis and with the tail gate through the cables wound on the drum in such a manner that the extent to which the tail gate may be opened is controlled yieldably by the degree of tilt of the dump body beyond said predetermined position.

4. In a dump truck of the character disclosed, the combination of a truck chassis, a tiltable dump body supported on said chassis, a swinging tail gate on the dump body adapted to swing open as the dump body is tilted into a load-discharging position, a drum rotatively supported on said dump body, means including a plurality of cables certain of which are wound on the drum for interconnecting said drum with the tail gate and chassis in such a manner that the extent to which the tail gate may be opened is controlled by the degree of tilt of the dump body and varied throughout the entire movement of the dump body when said cables are maintained in a taut condition, and resilient means interconnecting said drum and the dump body and adapted yieldably to rotate the drum and wind the cables thereon until the cables become taut.

5. In a dump truck of the character disclosed, the combination of a truck chassis, a tiltable dump body supported on said chassis, a swinging tail gate on the dump body adapted to swing open as the dump body is tilted into a load-discharging position, a drum rotatively supported on the dump body, resilient means interconnecting the dump body and drum and adapted yieldably to rotate the drum in one direction, non-yieldable means interconnecting the tail gate and drum whereby the tail gate is caused yieldably to move toward the closed position thereof as the drum rotates under power of said resilient means, and non-yieldable means interconnecting the truck chassis and drum and adapted to rotate the drum in an opposite direction as the dump body moves toward a fully tilted position thereof thereby to permit opening of the tail gate in accordance with the degree of tilt of the dump body.

6. In a dump truck of the character disclosed, the combination of a truck chassis, a tiltable dump body supported on said chassis, a swinging tail gate on the dump body adapted to swing open as the dump body is tilted into a load-discharging position, a drum rotatively supported on said dump body, resilient means interconnecting the dump body and drum and adapted yieldably to rotate the drum in one direction, a first cable means interconnecting the tail gate and drum and adapted to rotate the drum in the opposite direction when a force exceeding the tension in said resilient means is applied to the tail gate in a direction to open the same, and a second cable means interconnecting the chassis and drum and adapted to rotate the drum in said opposite direction as the dump body moves toward a fully tilted position thereof thereby to cause the first cable means to be payed out and to permit the tail gate to swing open in accordance with the degree of tilt of the dump body.

7. In apparatus for automatically operating a swinging tail gate on the tiltable dump body of a dump truck, the combination of a drum rotatively supported on the dump body, a gear secured to said drum for rotation therewith, a member on the truck chassis adapted to engage said gear between a pair of teeth thereof thereby to lock the gear and drum against rotation when the dump body comes to rest on the truck chassis, a first cable wound about the drum and secured thereto intermediate the ends thereof, a second cable secured at the ends thereof to the sides of the tail gate, means interconnecting said second cable and one end of said first cable for equalizing the pull on the tail gate when the drum is rotated in one direction, a third cable wound on the drum and secured at one end thereof to the drum and adapted to rotate the drum in the opposite direction as the dump body is tilted thereby to pay out said one end of said first cable to open the tail gate, and a coil spring secured at one end thereof to the dump body and secured at the other end thereof to the other end of said first cable for yieldably urging rotation of the drum in said one direction thereof thereby to maintain all of said cables taut and yieldably to urge the tail gate toward the closed position thereof.

EVERETT L. FOY.

REFERENCES CITED

The following references are of record in the file of this patent:

UNITED STATES PATENTS

| Number | Name | Date |
| --- | --- | --- |
| 804,412 | Kelly | Nov. 14, 1905 |
| 2,246,128 | Fairbanks | June 17, 1941 |
| 1,278,971 | Mayer | Sept. 17, 1918 |